Jan. 1, 1957 R. A. OLERUD 2,776,429

MULTIPLEX COMMUNICATIONS SYSTEM

Filed Jan. 27, 1951 4 Sheets-Sheet 1

INVENTOR
ROY A. OLERUD
BY Pennie, Edmonds, Morton, Barrows & Taylor.
ATTORNEYS

Jan. 1, 1957 R. A. OLERUD 2,776,429

MULTIPLEX COMMUNICATIONS SYSTEM

Filed Jan. 27, 1951 4 Sheets-Sheet 2

INVENTOR
ROY A. OLERUD
BY
Pennie, Edmonds, Morton, Barrows & Taylor.
ATTORNEYS

Jan. 1, 1957 R. A. OLERUD 2,776,429

MULTIPLEX COMMUNICATIONS SYSTEM

Filed Jan. 27, 1951 4 Sheets-Sheet 3

INVENTOR
ROY. A. OLERUD
BY Pennie, Edmonds, Morton, Barrows & Taylor.
ATTORNEYS

INVENTOR
ROY A. OLERUD
BY
Pennie, Edmonds, Morton, Barrows & Taylor
ATTORNEYS 2,776,429

MULTIPLEX COMMUNICATIONS SYSTEM

Roy A. Olerud, Maywood, N. J., assignor to Multiplex Development Corporation, New York, N. Y., a corporation of New York Application January 27, 1951, Serial No. 208,215
6 Claims. (Cl. 343—176)

This invention relates to multiplex communications systems, and in particular comprises a multiplex system readily adaptable to existing frequency modulation (FM) and television broadcast transmitters and receivers for the purpose of enabling simultaneous transmission of one or more subscription programs, or other intelligence, addressed to a specific audience or selected receiving points equipped with special multiplex receiving apparatus and without causing interference with the regular aural broadcasts as reproduced by conventional FM or television broadcast receivers now in the hands of the public.

The invention is especially applicable in the FM or television broadcast field as it provides means whereby multiple transmission of aural programs or other intelligence may be achieved with a minimum of equipment modification, engineering or other installation expense at an FM or television broadcast station, and therefore is readily adaptable to any type of FM broadcast transmitter, including the FM aural transmitters associated with television stations, now in general service throughout the world.

The invention also has a particular value when used as a part of a multiplex radio-relay broadcast system of the general type described in co-pending U. S. patent application Serial No. 170,011, "Multiplex Communications System," filed June 23, 1950.

In the multiplex broadcast system set forth in application Serial No. 170,011, secondary signals intended for non-interfering multiplex transmission via FM broadcast stations are impressed on superaudible FM subcarriers above 20 kilocycles. These subcarriers are superimposed at relatively low level on the main carrier of the FM broadcast station along with the main program signals in the audio input circuit of the basic modulator of the transmitter.

Inasmuch as subcarrier signals employed in multiplex broadcasting of music and multiple channel facsimile, for example, must have subcarrier frequencies substantially above 30 kilocycles in order to provide adequate bandwidth for multiple subcarriers, a serious problem has heretofore been presented in attempting to impress multiple subcarriers in the signal input circuits of existing modulators, many of which are totally ineffective in handling frequencies above 30 kilocycles, and which, in many instances, cannot be modified for transmission of superaudible subcarriers of FM type having center frequencies above 35 kilocycles.

It is a primary object of the present invention to provide multiple program transmission via existing FM broadcast stations wherein multiple subcarriers at various frequencies between 30 and 75 kilocycles or higher, if desired, may readily be impressed on the main FM carrier without extensive engineering and circuit modifications of existing FM transmitters at the broadcast stations.

It is an additional object of this invention to provide means whereby a high degree of radio-frequency circuit linearity, with respect to frequency response within the subcarrier bandwidths, is attained.

It is a further object of the invention to provide means of relatively simple type whereby the subcarrier signals may be received by means of a subcarrier adapter circuit operating in connection with a standard FM broadcast receiver, which, when desired, may also be employed to receive public broadcast programs modulating the main carrier of a broadcast station within the frequency range of approximately 50 to 15,000 cycles.

These and other objects are attained through the use of the multiplex system of the invention in which the normal frequency-modulated (or phase-modulated) wave generated in the modulator section of any existing FM broadcast transmitter is, after frequency multiplication, phase modulated by superaudible FM subcarriers to cause a small phase shift of the main FM carrier. The phase modulation by the superaudible FM subcarriers on the main FM carrier is accomplished in such manner that the total modulation, or, more accurately, frequency deviation, of the main carrier by the main (public) aural broadcast signals and the subcarrier program signals does not exceed 100% (as defined hereinafter), and no interference is thereby caused between the various program signals in conventional FM broadcast receivers now in the hands of the public. Inasmuch as the subcarrier signals are impressed on the main carrier at a point beyond the basic modulator circuits incorporated in existing FM broadcast transmitters, no modification of these circuits is required. Furthermore, by injecting the multiplex input at the correct point in the frequency multiplier chain, all background noise is substantially eliminated.

The phase modulator of the system hereinafter described was designed to introduce a phase shift of the order of two or three degrees (at a frequency which is one-sixth of the transmitter output frequency with a subcarrier frequency of 35 kc.) in order to attain a relatively low level of modulation or frequency deviation (about 10%) of the main carrier by the subcarrier signals in each subcarrier channel.

The system will be more fully understood by reference to the accompanying drawings and specifications in which Fig. 1 illustrates, in block diagram form, the multiplex transmitting system of the invention;

Figures 1, 2:
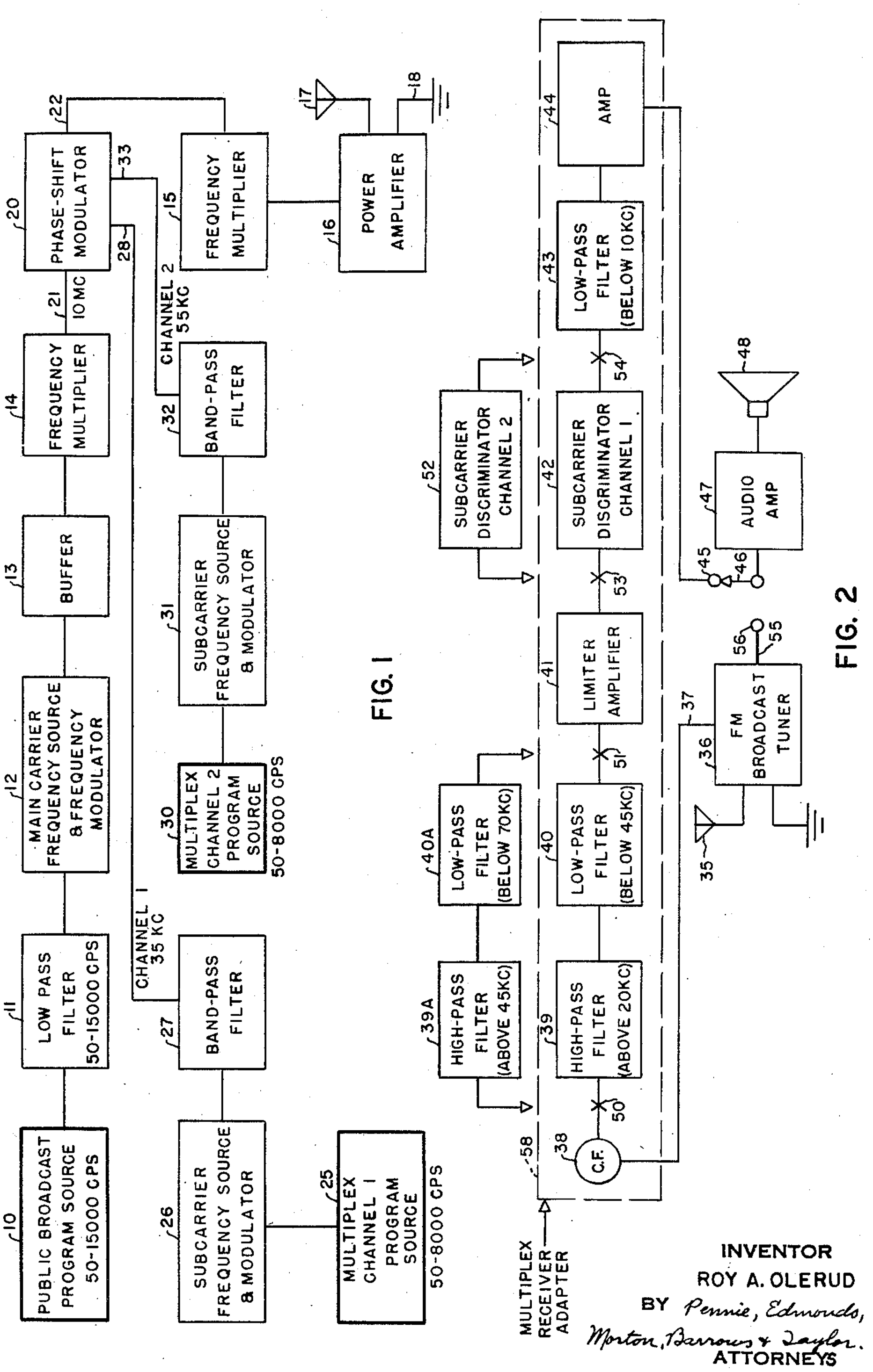
Fig. 2 is a block diagram of one form of multiplex subcarrier receiver utilized in the system of the invention.

Referring to the block diagram of Fig. 1 in detail, aural program signals within the audio frequency range between, say, 50 and 15,000 cycles from a public broadcast source 10, such as a broadcast studio, transcription playback unit, or other source of audio signals, are first passed through low-pass filter 11 to attenuate any harmonics of the aural program signals above 15,000 cycles. From low-pass filter 11, the aural program signals are applied to the input of a main-carrier frequency source and frequency modulator 12, which may be any conventional type of modulating equipment associated with an FM broadcast transmitter of which the frequency modulator 12, buffer 13, frequency multiplier 14, frequency multiplier 15, and power amplifier 16, of any conventional well-known type, are parts. Antenna 17 and ground 18 are connected to the output of the power amplifier 16.

In accordance with the system of the invention, a phase-shift modulator 20 is connected between frequency multipliers 14 and 15 to cause phase modulation of the frequency-modulated wave generated by the main carrier modulator unit 12. In this illustrative example, it will be noted that the phase-shift modulator 20 is connected in such manner that its input is connected to the 10 mc. (megacycles) output circuit 21 of frequency multiplier 14. The output circuit 22 of the phase-shift modulator 20 is connected to the input of frequency multiplier 15 as shown in the block diagram.

Aural program signals or other intelligence to be transmitted by multiplex method originate in multiplex channel 1 program source 25. This secondary program source may be designed to transmit audio-frequency signals in the range of 50–8000 cycles to accommodate specialized types of music intended for reception only by subscribers equipped with special multiplex receivers, of the illustrative type shown in Fig. 2, as is more fully described in the above-mentioned co-pending application Serial No. 170,011.

The audio frequency signals from multiplex channel 1 program source 25 are applied to the input of subcarrier frequency source and narrow band FM modulator 26, wherein the audio-frequency signals from source 25 effect frequency modulation of a superaudible subcarrier having a center frequency such as 35 kc. (kilocycles), for example, with a frequency swing of ±5 kc. While a narrow band FM subcarrier system is herein described in this illustrative embodiment of the invention, no specific limitation of band-width is implied.

The frequency-modulated subcarrier from modulator 26 is then passed through band-pass filter 27, which attenuates signal energy having frequencies above and below the desired pass-band allocated to the subcarrier, which in this illustrative example extends approximately ±8000 cycles with respect to the 35 kc. center frequency. The 35 kc. frequency-modulated subcarrier of channel 1 is then applied from the output of band-pass filter 27 to the subcarrier input 28 of phase-shift modulator 20, as will subsequently be described in further detail.

In similar manner, aural-program signals of multiplex channel 2 are supplied by program source 30, which may furnish a second special musical or other program intended for reception only by subscribers to the multiplex service. The audio-frequency energy from multiplex channel 2 program source is applied to the input of subcarrier frequency source and modulator unit 31, in which the audio signals effect narrow-band frequency modulation of the channel 2 subcarrier, which in this illustrative example has a center frequency of 55 kc. with swing of ±5 kc. The frequency-modulated signal energy from subcarrier modulator 31 is applied to the input of band-pass filter 32, which attenuates signal energy having frequencies above and below the pass-band. The output of band-pass filter 32 is connected to a subcarrier input circuit 33 of phase-shift modulator 20, as will subsequently be described in detail.

The operation of the basic transmitting system, as described, is such as to introduce phase modulation, at super-audible subcarrier frequencies, of the main FM carrier wave, which has already been frequency-modulated by aural program signals within the audio frequency range 15–15,000 cycles.

By virtue of the fact that the superaudible subcarriers are of constant amplitude, the percentage modulation, or frequency deviation, of the main carrier effected by the subcarriers is of fixed value, such as 10% per multiplex channel, or 20% for two channels, although it may total as high as about 40% for all subchannels. In a system according to the present invention frequency deviation of a value greater than approximately 40% is likely to be audible in ordinary FM receivers tuned to the main carrier. The main aural program signals in the audio spectrum between 50 and 15,000 cycles produce frequency modulation of the main carrier at varying modulation levels up to 80% depending upon the instantaneous amplitude of the aural program signals. These percentage modulation levels are based on an assumed maximum modulation depth, or frequency deviation, established by Government regulation as a modulation or frequency deviation reference level of 100%.

In order to attain 5–10% modulation of the main carrier by each of the subcarrier signals, the design of the phase-shift modulator is such that a phase shift of preferably no more than 2 or 3 degrees is produced. These figures relate to a frequency about one-sixth of the transmitter output frequency with a subcarrier frequency of 35 kc. This small change in phase introduces no operational problems with respect to simultaneous transmission of aural broadcast programs in the main channel. The superaudible subcarrier signals, impressed by the present phase-shift method on the frequency-modulated wave, cause no interference whatever with reception of the main aural programs by conventional FM broadcast receivers. Further, the combined emission of the main aural and subcarrier program signals causes no increase in the bandwidth of the broadcast station, which may continue to operate in accordance with existing standards established for conventional FM broadcasting by the Federal Communications Commission.

In a representative multiplex receiver, operable in the system of the invention, the radio signals from transmitting antenna 17, Fig. 1, are picked up by receiving antenna 35, Fig. 2, connected to the signal input of a conventional FM broadcast tuner 36. By means of a circuit connection with the FM discriminator output 37, of the FM broadcast tuner 36, superaudible subcarrier signals, as well as aural program signals are applied to the input circuit of a cathode follower 38, the output of which is connected to the input of a high-pass filter 39. The details of such a circuit connection including an FM tuner are shown in a co-pending U. S. patent application Serial No. 179,195, filed August 14, 1950.

The high-pass filter 39 blocks the passage of the aural program signals within the range 15–15,000 cycles and permits passage of subcarrier signals above 20 kc. to the input of low-pass filter 40. This filter is used to permit selective passage of the 35 kc. subcarrier employed in the illustrative system and serves to block the 55 kc. subcarrier. The output of low-pass filter 40 is connected to the input of limiter-amplifier 41 which effectively eliminates any amplitude variations beyond the saturation point of the limiter, thereby reducing noise "breakthrough" of aural program signals from the main channel and removing any small amplitude variations in the subcarrier. The output of limiter-amplifier 41 is connected to the input of subcarrier discriminator 42 which, in general circuit arrangement, may be similar to that of the subcarrier discriminator shown in copending application Serial No. 179,195, filed August 14, 1950.

The audio-frequency output of subcarrier discriminator 42 is applied through low-pass filter 43 to audio amplifier 44. Low-pass filter 43 eliminates undesired signal energy or noise above 10 kc. and blocks the passage of the 35 kc. subcarrier to the input of audio amplifier 44. The output of audio amplifier 44 is connected through switch contact 45 and switch arm 46 to the input of audio amplifier 47, having a loud speaker 48 in its output circuit.

For reception of the 55 kc. subcarrier, high-pass filter 39 is replaced by high-pass filter 39A, which is effective in passing subcarrier energy above 45 kc. Low-pass filter 40 is replaced by low-pass filter 40A, which passes subcarrier energy below 70 kc. These two filters may be of plug-in type connectible at the points 50 and 51, respectively, which represent points of circuit connection for either (1) high-pass filter 39 and low-pass filter 40 or (2) high-pass filter 39A and low-pass filter 40A. In similar manner, to permit reception of the 55 kc. subcarrier, the subcarrier discriminator 42 may be replaced by a plug-in subcarrier discriminator 52 for multiplex channel 2 by a suitable connection at the points 53 and 54, which disconnect discriminator 42.

The FM broadcast tuner 36 may, if desired, be used for reception of the main-channel aural broadcast program by connection of the audio output circuit 55 of tuner 36 to the switch contact 56. Rotation of the switch arm 46 to make connection with contact 56 then permits the main-channel aural program signals to be applied to amplifier 47 and, after amplification, reproduced by loud speaker 48.

Figure 3:
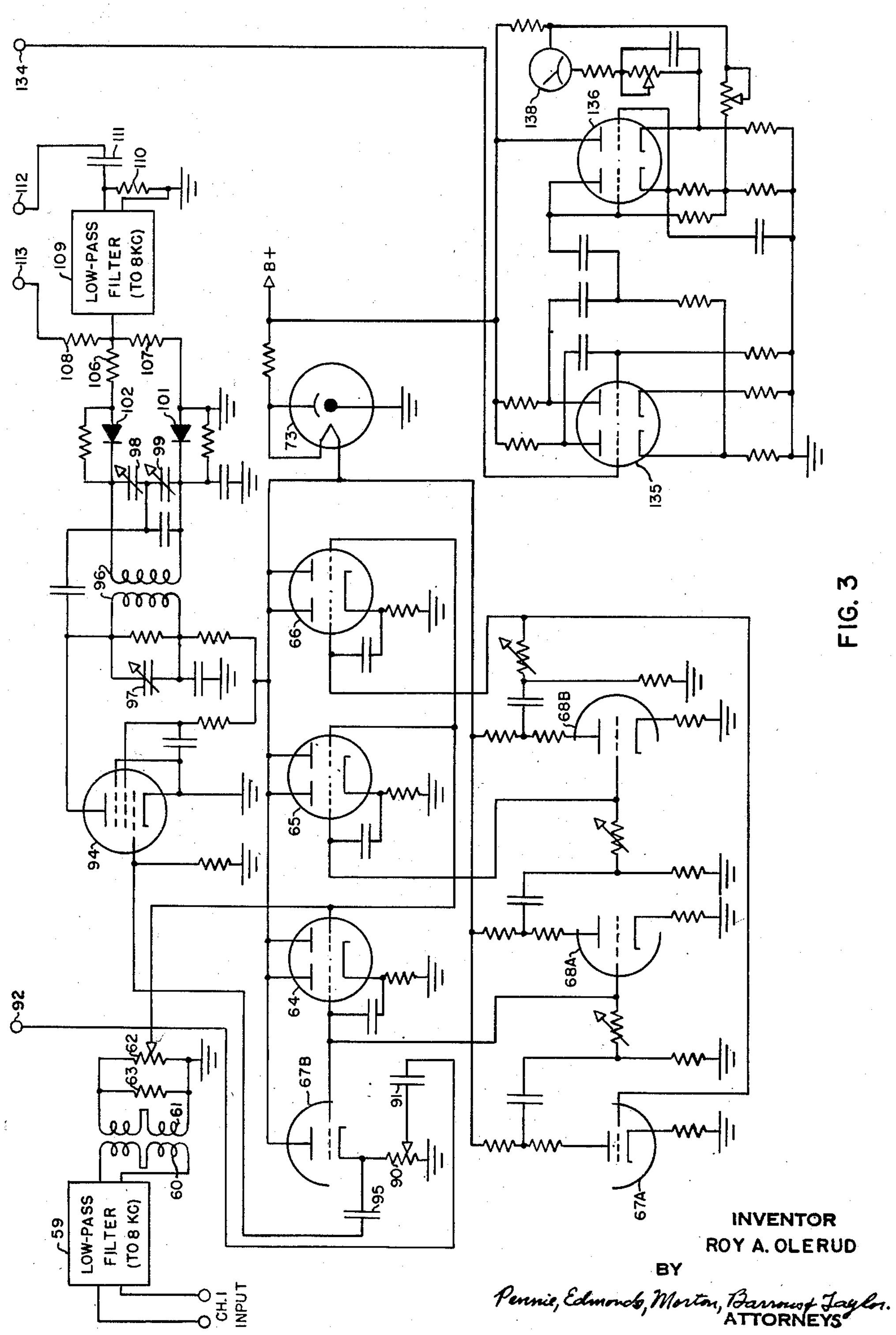
Fig. 3 is a circuit diagram of a subcarrier frequency source and FM modulator employed in one multiple channel of an illustrative two-channel multiplex subcarrier transmitting arrangement of the system of Fig. 1.

Referring to the circuit diagram of Figure 3, in which details of a presently preferred form of subcarrier modulator are illustrated, audio frequency signals associated with multiplex channel 1 which originate in an aural program source 25 (Fig. 1) are applied at the input of low-pass filter 59 which attenuates audio signal energy above 8 kc. to remove any harmonics after filtering, the audio signals are applied to transformer input winding 60. Transformer secondary 61 is connected to potentiometer 62 and shunt resistor 63, as shown. The arm of potentiometer 62 is thence connected to the control grids of vacuum tubes 64, 65 and 66 which comprise the variable reactance elements of a ring type phase-shift oscillator comprising the tube sections 67A, 68A and 68B, with the tube section 67B forming a cathode-follower output stage as shown. The input capacitances of tubes 64, 65 and 66 form the capacitance elements of an RC phase-shift oscillator. The input capacitance of a triode is $[C_{gk}+C_{gp}(\mu+1)]$ according to the well known Miller Effect. Variation of the signal grids of the dual triodes 64, 65 and 66, effectively changes the tube amplification factor or $\mu$, thereby changing the input capacitances of these tubes. The cathode-follower output of tube 67B is connected through potentiometer 90 and coupling capacitor 91 to the subcarrier modulator output terminal 92. Output terminal 92 then is connected with terminal 93, Fig. 4, which is connected directly to the primary of output transformer 159, Fig. 4 employed to obtain a desired output impedance.

The cathode-follower output of tube 67B, Fig. 3, also is connected through coupling capacitor 95 to the control grid of vacuum tube 94 employed as a subcarrier amplifier and limiter tube in a subcarrier monitor circuit. The plate circuit of amplifier tube 94 is connected, as shown, to subcarrier discriminator transformer 96, having tuning condenser 97 across its primary and tuning condensers 98—99 across its secondary in conventional well-known manner.

Crystal diodes 101 and 102 are connected in conventional manner in the balanced discriminator output circuit to demodulate the FM subcarrier, thereby providing audio-frequency signals in the output circuit. Isolation resistor 106 and load resistor 107 are connected in the audio output circuit as shown, resistor 107 being employed to provide optimum impedance match for the input circuit of low-pass filter 109 which attenuates audio signal energy above 8 kc., thereby removing any R. F. energy from the audio output circuit. The output circuit of low-pass filter 109 has load resistor 110 in shunt connection as shown, with the output circuit being completed through coupling capacitor 111 to audio output monitor terminal 112. Series resistor 108 is connected between the audio output circuit of the subcarrier discriminator and output terminal 113.

Figure 4:
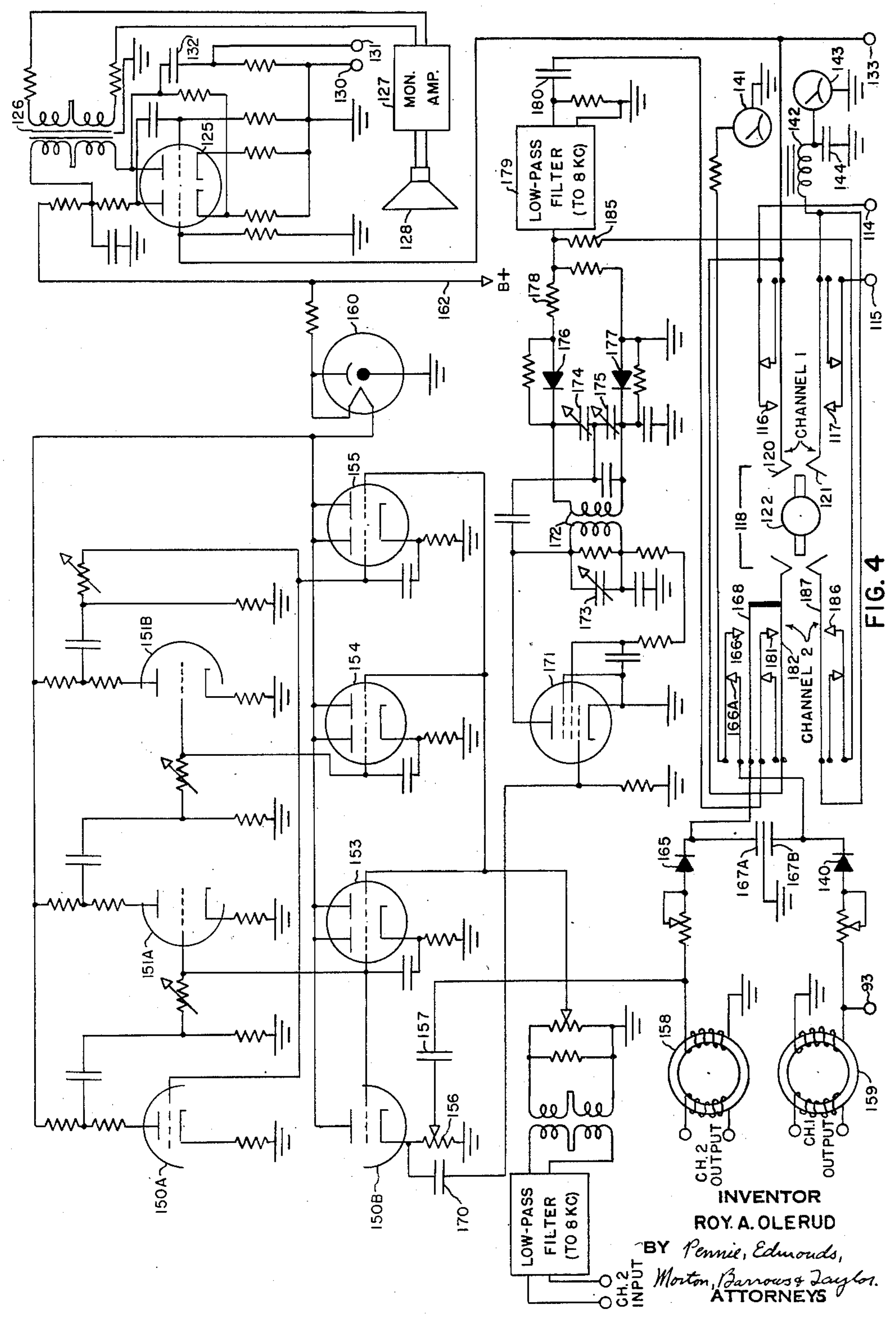
Fig. 4 is a circuit diagram of the second multiplex channel and other portions of the two-channel sub-carrier modulator shown in block diagram form in Fig. 1.

Output terminals 112 and 113 are connected to monitor terminals 114 and 115, respectively, shown at the bottom of Fig. 4. Terminals 114 and 115 are connected to the contacts 116 and 117, respectively, of monitor transfer switch 118, as shown. Switch 118 enables transfer of the audio monitoring and subcarrier metering circuits to the subcarrier output circuits of the modulators associated with multiplex channel 1 or channel 2.

When transfer switch 118 is in the channel 1 position, the arms 120 and 121 of switch 118 are moved outwardly by the action of key 122, thereby establishing closure of contact 116 and arm 120, and closure of contact 117 and arm 121. This action of the switch in the channel 1 position applies audio signal voltage from terminal 114 through contact 116 to arm 120 and thence to the control grid of dual-triode amplifier tube 125 having in its output circuit audio transformer 126, connected in well-known manner as shown. The secondary winding of transformer 126 provides a desired impedance match with monitor amplifier 127 and loud speaker 128, as shown. An alternate high impedance output circuit for monitoring purposes is provided at terminals 130, 131 with circuit connection through coupling capacitor 132 to a plate output circuit of tube 125.

Subcarrier signal energy from channel 1 audio monitor output at terminal 114 is applied by switch 118, when in the channel 1 position, from contact 116 through arm 120 to terminal 133. Terminal 133 is connected to terminal 134, Fig. 3, from which the audio signal energy is applied to the control grid of tube 135, Fig. 3. The amplified signal from tube 135 is then rectified by tube 136, as shown. Meter 138 is connected in the output circuit of rectifier tube 136 and is actuated by the rectified audio components of the demodulated subcarrier to give indication of percentage of modulation of the subcarrier.

The switch 118 is employed in channel 1 position to apply rectified signal voltage derived from subcarrier rectifier 140, Fig. 4, through switch contact 166A to meter 141, which indicates subcarrier output level. Transfer switch 118 also serves, when in channel 1 position, to apply the D. C. component of the demodulated subcarrier as provided at terminal 115, through switch contact 117 to switch arm 121, thence through choke 142 to subcarrier frequency-deviation meter 143. Choke 142 and capacitor 144 form a filter which removes any A. C. components from the demodulated subcarrier and applies D. C. only to the meter 143, which provides visual indication of frequency deviation of the subcarrier.

The subcarrier source and modulator circuit for multiplex channel 2 are similar to those of channel 1. Vacuum tubes 150A, 151A—151B, Fig. 4, form a ring type phase-shift oscillator. Tubes 153, 154 and 155 comprise the variable reactance elements of the phase-shift oscillator. Modulated subcarrier output is derived from triode section 150B having a cathode-follower output in which the subcarrier signal is applied through potentiometer 156 and coupling capacitor 157 to the primary winding of output transformer 158. As in the circuit diagram associated with channel 1, a voltage regulator tube 160 is employed in the subcarrier modulator plate supply circuit having connection 162 with a source of plate potential. Subcarrier signal voltage from tube section 150B is applied through coupling capacitor 170 to the control grid of amplifier-limiter tube 171, the output circuit of which is connected with subcarrier discriminator transformer 172, having tuning capacitor 173 connected across its primary winding and tuning capacitors 174 and 175 connected across the secondary winding, as shown. Discriminator rectifiers 176 and 177 apply signal voltage through isolation resistor 178 to the input of low-pass filter 179.

Monitor transfer switch 118 when in channel 2 position, applies subcarrier energy from rectifier 165, connected with the primary of output transformer 158, through switch arm 168 to contact 166 and thence to the output-level meter 141.

The output circuit of low-pass filter 179 is connected through coupling capacitor 180 to contact 181 of monitor transfer switch 118. When the key 122 of this switch is in position to monitor channel 2, contact 181 makes connection with switch arm 182 which is moved upward by the key 122. This applies audio signal voltage to the control grid of audio amplifier tube 125 and, after amplification, through output transformer 126 to monitor amplifier 127 and loud speaker 128. Also, when the key 122 of switch 118 is in the channel 2 position the upward movement of switch arm 168 applies rectified subcarrier signal voltage from crystal diode rectifier 165 to switch contact 166 and then to the subcarrier output-level meter 141. The lower switch arm 187, when moved downward by key 122 to the channel 2 position, applies direct current from subcarrier discriminator rectifiers 176—177, after passing through series resistor 185 from contact 186 to arm 187, causing flow of D. C. components of the demodulated subcarrier through filter choke 142 to subcarrier frequency-deviation meter 143.

In the manner shown, monitoring of either of the two subcarrier channels may be provided, as desired, through the selective operation of monitor transfer switch 118. This avoids duplication of all subcarrier monitoring facilities.

Figure 5:
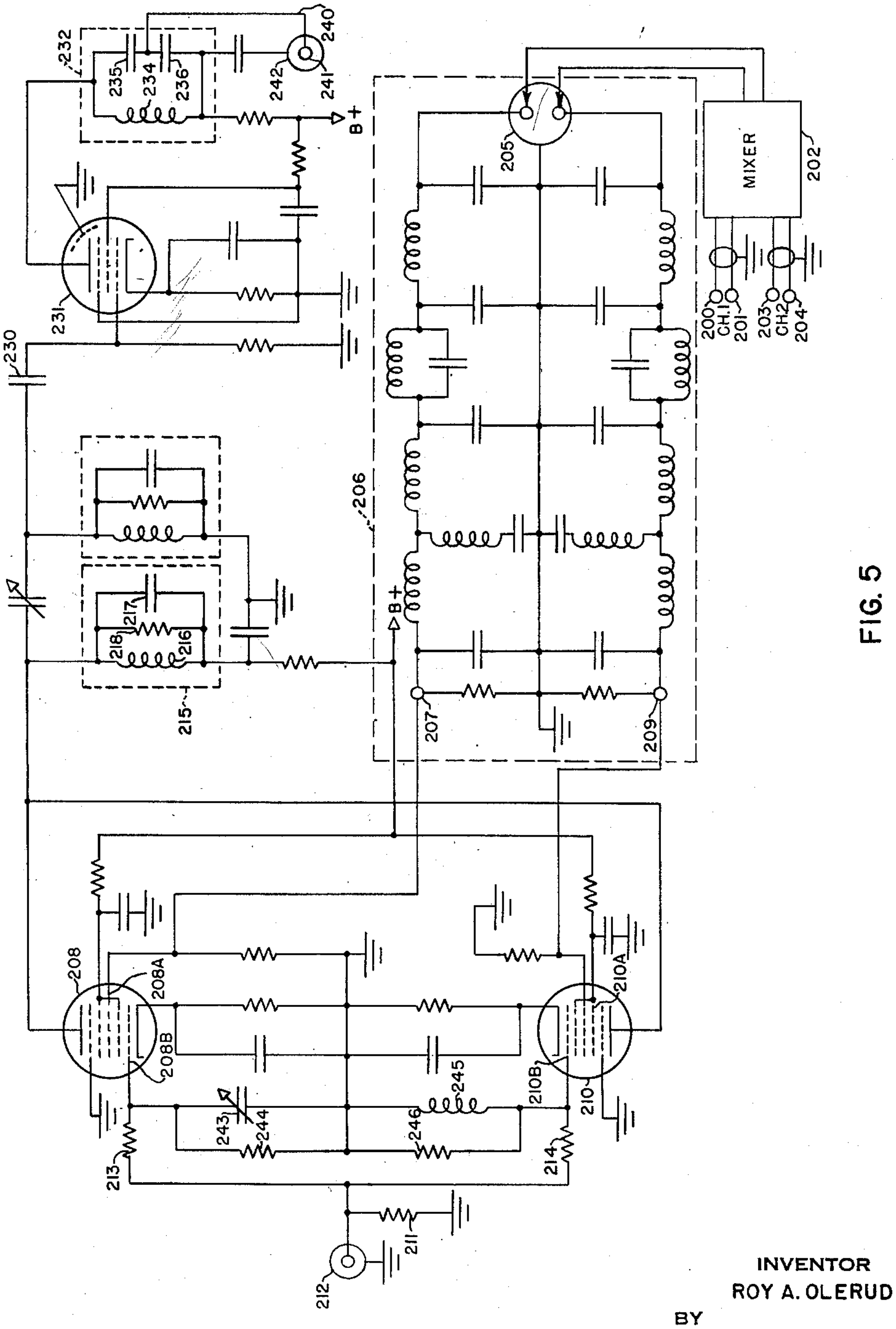
Fig. 5 is a circuit diagram of a phase-shift modulator employed in the system of the invention in impressing the multiplex subcarriers on the main carrier of an FM broadcasting station, in accordance with the system shown in block diagram form in Fig. 1.

Referring now to Fig. 5, there are shown circuit details of a presently preferred form of phase-shift modulator for compression of the superaudible subcarriers on the main FM carrier. Frequency-modulated subcarrier signals from the output transformer 159, Fig. 4, associated with subcarrier channel 1 are applied to input terminals 200 and 201, Fig. 5, of mixer 202. Frequency-modulated signals from output transformer 158, Fig. 4, associated with subcarrier channel 2, are applied to terminals 203 and 204, Fig. 5, also associated with subcarrier wave combiner or mixer 202. The output of mixer 202 is connected through a suitable plug receptacle 205 to the input circuit of balanced push-pull band-pass filter unit 206 of suitable well-known type, as shown. The filters in this unit are proportioned to block at the output of the mixer substantially all frequencies outside of the frequency bands occupied by the subcarrier channels, for example, subcarrier harmonics and subcarrier interaction or intermodulation products caused by the combining of the subcarriers in the mixer. The filtered subcarrier signal voltage is applied from the output terminal 207 of filter unit 206 to the injection grid 208A of pentagrid converter tube 208, as shown. The output terminal 209 of filter 206 is connected to the injection grid 210A of pentagrid converter 210.

The main frequency-modulated carrier from main carrier frequency source and modulator 12, Fig. 1, after frequency multiplication by frequency multiplier 14, Fig. 1, is applied at a suitable intermediate frequency such as 10 megacycles to the coaxial input connector 212, Fig. 5, which comprises the input terminal to the Phase-Shift Modulator 20 of Fig. 1. The components shown in Fig. 5 are assumed to be included in the block 20 of Fig. 1. The 10-megacycle frequency modulated carrier then is applied through series resistor 213 to the control grid of pentagrid converter 208 and through series resistor 214 to the control grid of pentagrid converter 210. Input load resistor 211 is connected between the R. F. input circuit of the phase-shift unit and ground, as illustrated, and provides a resistive load which remains aperiodic over the frequency range of the frequency modulated main carrier wave applied from the preceding frequency multiplier 14, Fig. 1.

Capacitor 243 shunted by resistor 244 constitutes a reactive network which acts to advance slightly the phase of the incoming R. F. signal applied to the control grid 208B of tube 208. Inductance 245 shunted by resistor 246 constitutes a reactive network to retard slightly the phase of the incoming R. F. signal applied to the control grid 210B of tube 210. With no multiplex signal applied to grid 208A of tube 208 and grid 210A of tube 210, the vertically displaced R. F. signals from the plates of tubes 208 and 210 are combined additively in the broad-band transformer 215. When the multiplex carrier signal is applied, push pull, to the injection or signal grids 208A and 210A of tubes 208 and 210, the amplitudes of the vectorially displaced R. F. signal at the plates of tubes 208 and 210 are correspondingly varied. The addition of the vectorially displaced, varying amplitude, R. F. signals in the broad-band transformer 215 produces a phase-modulated R. F. signal in a well known manner.

The combined frequency-modulated and phase-modulated carrier from broad-band transformer 215 is applied through coupling capacitor 230 to the control grid of R. F. amplifier tube 231, as shown. The output circuit of this tube comprises an impedance-matching pi network 232 consisting of inductor 234 and capacitors 235 and 236, forming the tuned plate circuit of tube 231. The output lead 240 of network 232 is connected to the center sleeve 241 of coaxial connector 242 which thus constitutes an output terminal adapted to be connected to the input of the next successive frequency multiplier stage.

By means of the arrangement as shown in Fig. 5, the multiplex system of the invention may readily be applied to any existing FM transmitter in the form of a "package," if desired, since it is merely necessary to connect the R. F. output of a selected frequency multiplier stage, such as output 21 of multiplier 14, Fig. 1 to coaxial connector 212, Fig. 5. The frequency value or level in the chain of frequency multiplier stages of the existing FM transmitter at which the phase modulation is introduced should be sufficiently high as to produce no distortion or audible effect with respect to the main broadcast program signals as reproduced by a standard FM broadcast receiver. It is assumed, of course, that the apparatus of block 20 of Fig. 1 would not be present in such existing FM transmitter. The coaxial output connector 242, Fig. 5, of the phase-shift unit is then connected to the input 22 of the following frequency multiplier stage 15, Fig. 1, the normal connection between these two multiplier stages having been broken. The FM broadcast transmitter will then function in normal manner, carrying both the main broadcast program signals, intended for public reception and the multiplex subcarrier signals intended for reception on special subcarrier receivers, without intermodulation or other form of mutual interference.

It will be noted that the radio frequency signal applied to the input 212, Fig. 5, of the phase modulator is a normal frequency-modulated carrier, frequency modulated by conventional method, whose frequency variations correspond to amplitude variations in the applied aural program signals of the public broadcast channel within the audio range between, say 50 and 15,000 cycles. This FM carrier wave is then phase-modulated by the FM subcarriers, with variation in phase corresponding to the frequency variations of the superaudible subcarriers, each of which is of constant amplitude. Injection of phase modulation in this manner, at a relatively low modulation level with respect to the modulation level of the main FM carrier as applied to the input of the phase-shift modulator, produces no interference whatever with reception of the main aural program signals by the general public, employing FM broadcast receivers of any well-known type.

Further, because of the relatively low level of the phase modulation as compared with the much higher modulation level produced on the main carrier by the main aural program signals, no operational difficulties are introduced at a broadcast station, nor is there any detrimental effect at FM receiving points with respect to observable change in dynamic range, signal-to-noise ratio, or frequency response characteristics within the high fidelity audio spectrum between 50 and 15,000 cycles.

While the illustrated system of the invention, as described, is applicable to public FM broadcast services, it is obvious that the system of the invention can be applied in connection with television broadcasting where the phase shift method of the invention may be applied to the FM sound transmitter of standard television stations. The system may also be utilized in association with FM communications equipment of various other types now in service.

While a preferred embodiment of the invention is shown herein, it is to be understood that variation, modifications and changes may be made within the spirit of the subjoined claims. For example, although the present invention is described above in connection with frequency-modulated main carrier and subcarrier waves, the invention is not limited thereto, because amplitude-modulated main carrier and/or subcarrier waves may be phase-modulated to provide multiplex signaling in accordance with the invention. However, as a practical matter, in employing amplitude modulation, the main carrier wave should be phase-modulated before it is amplitude-modulated.

I claim:

1. In combination with a radio transmitter including means for generating in a main channel a main carrier wave and means for frequency-modulating said wave with a first signal source over a certain audio-frequency range, means for multiplexing on said wave substantially without interaction between the several channels which comprises a first subcarrier channel including a first subcarrier wave generator adapted to generate a wave of constant amplitude and of a first superaudible frequency, a second signal source and means for frequency-modulating said subcarrier wave therewith, a second subcarrier channel including a second subcarrier wave generator adapted to generate a wave of constant amplitude and of a second superaudible frequency which is separated from that of the first subcarrier wave by a superaudible frequency difference, a third signal source and means for frequency-modulating said second subcarrier wave therewith, a wave mixer connected to the outputs of said first and second subcarrier channels for combining the frequency-modulated subcarrier waves, filter means of balanced push-pull type symmetrical with respect to ground having an input connected to the output of said mixer, said balanced filter means being proportioned to pass the frequency band occupied by said subcarrier channels and to eliminate higher frequencies, thermionic phase-modulator means of push-pull type connected to phase-modulate said main carrier by said modulated subcarriers simultaneously, means connecting the frequency-modulated main carrier wave to two control grids of said phase modulator means, means symmetrically connecting two outputs of said balanced filter means to two injector grids of said phase-modulator means, an output for said phase-modulator means, and means including a broadband coupling network adapted to couple said last-mentioned output to transmitter radiating means.

2. In a system for reducing interaction between a main channel and a plurality of subcarrier channels and between said subcarrier channels in a frequency-modulation multiplex transmitter, comprising a main carrier frequency source of constant amplitude, means for frequency modulating said carrier by varying amplitude signals from a first source, and a plurality of frequency multiplier stages for multiplying the frequency of said modulated carrier, a first subcarrier channel including a first subcarrier frequency source of constant amplitude and superaudible frequency, a second source of signals and means for frequency modulating said first subcarrier thereby, the improvement which comprises a second subcarrier channel including a second subcarrier frequency source of constant amplitude and superaudible frequency which is separated from that of the first subcarrier by a superaudible frequency difference, a third source of signals of smaller frequency range than that of said second signals and means for frequency modulating said second subcarrier by said third signals, a mixer coupled to the outputs of both subcarrier channels for combining the modulated subcarriers, a symmetrical filter coupled to the output of said mixer and proportioned to block substantially all subcarrier channel harmonics, said filter being of push-pull type and having two output terminals with respect to ground, a push-pull thermionic phase-shift modulator having two signal grids connected respectively to said terminals in push-pull relation and two control grids coupled in phase-displaced relation respectively to the output of a certain of said frequency multiplier stages by coupling means aperiodic with respect to the frequency range of the frequency-modulated main carrier wave at the output of said certain multiplier stage, and broadband coupling means coupling the output of said phase-modulator to the input of a second of said frequency multiplier stages.

3. Apparatus for converting a frequency-modulation radio transmitter, of the type having a main signal channel which includes a plurality of cascade-coupled frequency multipliers, to multiplex operation by interposing between two successive frequency multipliers a plurality of additional signal channels substantially without causing interchannel interference, which comprises first and second subcarrier channels each including a source of subcarrier waves and separate means for frequency-modulating each subcarrier, said waves being of different superaudible frequencies and differing from each other by a superaudible frequency, a mixer coupled to the outputs of both subcarrier channels for combining the modulated subcarriers, filter means common to the combined output of said mixer and being of balanced push-pull type having two output terminals with respect to ground, said filter means being proportioned to pass the frequency band occupied by said subcarrier channels and to eliminate higher frequencies, a thermionic phase-shift modulator which includes two injection grids connected in push-pull relationship to said filter terminals, said modulator also including two control grids and a phase-shift network connected between each of said control grids and ground, input terminal means adapted to be connected to the output of a frequency multiplier of said transmitter, circuit means connecting said control grids to said input terminal means, broadband coupling means connected between said input terminal means and ground and proportioned to provide substantially constant impedance and linear response at the output of said frequency multiplier over the main-channel frequency range of said transmitter, output terminal means adapted to be connected to the input of a second of said frequency multipliers so that said apparatus is electrically interposed between successive frequency multipliers, and second broadband coupling means including means connecting the output of said phase-shift modulator to said output terminal means.

4. Apparatus according to claim 3, in which said second broadband coupling means includes an impedance network which provides a substantially broadband response within said main-channel frequency range, a vacuum tube amplifier having a grid coupled to the output of said second broadband coupling means and a plate connected to said impedance network, and a connection from the output of said impedance network to said output terminal means, said impedance network being proportioned substantially to match the output impedance of said vacuum tube to the input impedance of said second frequency multiplier.

5. Apparatus according to claim 3 in which one of said phase-shift networks includes an inductive reactance and the other phase-shift network includes a capacitive reactance.

6. Apparatus for converting a frequency-modulation radio transmitter, of the type having a main signal channel which includes a plurality of cascade-coupled frequency multipliers, to multiplex operation by interposing between two successive frequency multipliers at least one additional signal channel substantially without causing interchannel interference, which comprises a subcarrier channel including a source of subcarrier waves of superaudible frequency and means for frequency modulating the subcarrier, filter means of the balanced symmetrical push-pull type having two input and two output terminals and a common ground terminal, said filter means being proportioned to pass the frequency band comprising the subcarrier channel frequencies and to eliminate higher frequencies, means for coupling said input terminals to said subcarrier source, a thermionic phase-shift modulator which includes two injection grids connected to said output terminals in push-pull relationship with respect to ground, said modulator also including two control grids and a phase-shift network connected between each of said control grids and ground, input terminal means adapted to be connected to the output of one of said frequency multipliers, circuit means connecting said control grids to said input terminal means, broadband coupling means connected between said input terminal means and ground and proportioned to provide substantially constant impedance and broadband response at the output of said frequency-multiplier over the main-channel frequency range of said transmitter, output terminal means adapted to be connected to the input of a second of said frequency multipliers so that said apparatus is electrically interposed between successive frequency multipliers, output impedance-matching coupling means of broadband characteristics connected to said output terminal means and having an output impedance proportioned substantially to match the input impedance of said second frequency multiplier, and second broadband coupling means connecting the output of said phase-shift modulator to said output impedance-matching coupling means.

References Cited in the file of this patent

UNITED STATES PATENTS

| | | |
|---|---|---|
| 2,045,107 | Shore | June 23, 1936 |
| 2,104,012 | Armstrong | Jan. 4, 1938 |
| 2,233,183 | Roder | Feb. 25, 1941 |
| 2,298,409 | Peterson | Oct. 13, 1942 |
| 2,378,298 | Hilferty | June 12, 1945 |
| 2,407,308 | Lorenzen et al. | Sept. 10, 1946 |
| 2,462,417 | Norton | Feb. 22, 1949 |
| 2,510,144 | Schriefer | June 6, 1950 |
| 2,512,530 | O'Brien et al. | June 20, 1950 |
| 2,514,425 | Thompson | July 11, 1950 |
| 2,578,714 | Martin | Dec. 18, 1951 |
| 2,630,497 | Armstrong | Mar. 3, 1953 |